United States Patent [19]

Leverault et al.

[11] Patent Number: 5,612,852
[45] Date of Patent: Mar. 18, 1997

[54] COMPACT HOUSING FOR A COMPUTER WORKSTATION

[75] Inventors: Craig M. Leverault, Mountain View; Michael F. McCormick, Jr.; Robert J. Lajara, both of San Jose; Alan W. Lam, Fremont; Peter C. D. Ta, Hayward; Howard W. Stolz, Soquel; Jay K. Osborn, San Francisco; Michael S. Dann, Mountain View; Ronald Barnes, Livermore, all of Calif.

[73] Assignee: Sun Microsystems, Inc., Mountain View, Calif.

[21] Appl. No.: 610,844

[22] Filed: Mar. 5, 1996

Related U.S. Application Data

[63] Continuation of Ser. No. 205,311, Mar. 2, 1994, abandoned.

[51] Int. Cl.$^6$ .................. H05K 5/00; H05K 7/20
[52] U.S. Cl. ............ 361/687; 361/692; 361/709
[58] Field of Search .................. ; 361/687–690, 361/694, 681–683, 724, 708.1, 704, 707, 831, 709–711; 345/905, 73, 75; 165/80.3; G06F 1/16

[56] References Cited

U.S. PATENT DOCUMENTS

| | | | |
|---|---|---|---|
| 3,956,673 | 5/1976 | Seid | 317/100 |
| 4,158,220 | 6/1979 | Yamamoto et al. | 361/415 |
| 4,535,386 | 8/1985 | Frey, Jr. et al. | 361/389 |
| 4,973,951 | 11/1990 | Shigeta et al. | 340/717 |
| 4,998,180 | 3/1991 | McAuliffe et al. | 361/407 |
| 5,006,925 | 4/1991 | Bregman et al. | 357/82 |
| 5,051,868 | 9/1991 | Leverault et al. | 361/395 |
| 5,132,872 | 7/1992 | Hase | 361/383 |
| 5,235,493 | 8/1993 | Yu | 361/685 |
| 5,297,025 | 3/1994 | Shoquist et al. | 361/704 |
| 5,313,362 | 5/1994 | Hatada et al. | 361/709 |
| 5,329,427 | 7/1994 | Hogdahl | 361/730 |
| 5,417,012 | 5/1995 | Brightman et al. | 49/382 |
| 5,424,917 | 6/1995 | Hiruta | 361/699 |

FOREIGN PATENT DOCUMENTS

| | | | |
|---|---|---|---|
| 5341874 | 12/1993 | Japan | G06F 1/16 |
| 6-250757 | 9/1994 | Japan | G06F 1/16 |

OTHER PUBLICATIONS

"Innovative Technologies On.ix Workstation Product Description", Oct 1991.

Primary Examiner—Leo P. Picard
Assistant Examiner—Phuong T. Vu
Attorney, Agent, or Firm—Flehr, Hohbach, Test, Albritton & Herbert

[57] ABSTRACT

A compact housing for a workstation-class computer is disclosed. The apparatus includes a structural heat sink with a horizontal base heat sink that includes an interchangeable power source housing and a hard disk drive receptacle. The horizontal base heat sink operates to conduct heat away from the functional elements positioned within the interchangeable power source housing and the hard disk drive receptacle. The structural heat sink also includes a vertical tower heat sink to support functional elements including a power converter. The vertical tower heat sink operates to conduct heat away from the functional elements. The vertical tower heat sink also includes support devices for receiving a detachable pivot display system. The structural heat sink is surrounded by a vented exterior skin that facilitates convective heat transfer from the structural heat sink.

27 Claims, 8 Drawing Sheets

5,612,852

COMPACT HOUSING FOR A COMPUTER WORKSTATION

This is a continuation of application Ser. No. 08/205,311 filed Mar. 2, 1994 now abandoned.

BRIEF DESCRIPTION OF THE INVENTION

This invention relates generally to housings that enclose computer components. More particularly, this invention relates to a compact housing for a workstation-class computer that does not include active cooling elements.

BACKGROUND OF THE INVENTION

Workstation-class computers are generally viewed as computers with more computational power than personal computers, but with less computational power than mainframe computers. Workstation-class computers may be characterized as consuming between 100 and 250 watts of power. This relatively large power consumption results in problematic heat generation at the power supply, video display, and at the central processing unit. Traditionally, the heat generation problem has been solved by providing active cooling elements, such as fans, within the computer housing. These additional components have mitigated against the construction of compact housings for workstation-class computers. Because of the large power requirements of a workstation-class computer, portable personal computer housing technologies are not readily applicable to workstations. Instead, novel housing approaches are necessary to accommodate the large power consumption associated with workstation-class computers. It would be highly desirable to construct a compact computer housing for a workstation-class computer that provides adequate heat dissipation capability without relying upon active cooling elements.

Many users of workstation-class computers desire a computer housing with a small footprint; that is, a computer housing that consumes a relatively small amount of horizontal area on a work surface, such as a desk. This problem has been addressed in the prior art by providing a vertical housing that stands as a "tower" on a work surface. The problem with this approach is that the tower is relatively unstable. To stabilize the tower, separate support structures have been used. The separate support structures of the prior art greatly increase the footprint of the computer. Since the support structures serve only as support structures, their functionality is limited. Thus, it would be desirable to provide a stable tower computer housing that maintains a small footprint and in which the support structure is fully functional.

Servicing the electronics positioned within a computer housing generally entails the time consuming use of screw drivers to remove the numerous screws that hold the housing together. It would be desirable to provide a computer housing that allows access to interior electronic elements with a minimal use of fasteners, such as screws, and the tools associated with fasteners, such as screw drivers.

Portable personal computers utilize flat panel displays. Typically, the flat panel display is connected to the computer in such a manner that it is difficult to remove the display. It would be desirable to provide a flat panel display that is readily engaged and disengaged with a computer.

Portable personal computers commonly rely upon batteries for power. If a battery is not used, then an external power supply connected between the computer and an electrical wall outlet is used. It would be desirable to provide a computer housing that internally holds either a battery or a power supply, as desired at any given time.

SUMMARY OF THE INVENTION

The compact housing of the invention is used in conjunction with a workstation-class computer. The apparatus includes a structural heat sink with a horizontal base heat sink that includes an interchangeable power source housing and a hard disk drive receptacle. The horizontal base heat sink operates to conduct heat away from the functional elements positioned within the interchangeable power source housing and the hard disk drive receptacle. The structural heat sink also includes a vertical tower heat sink to support functional elements including a power converter. The vertical tower heat sink operates to conduct heat away from the functional elements. The vertical tower heat sink also includes support devices for receiving a detachable pivot display system. The structural heat sink is surrounded by a vented exterior skin that facilitates convective heat transfer from the structural heat sink without relying upon active cooling elements.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
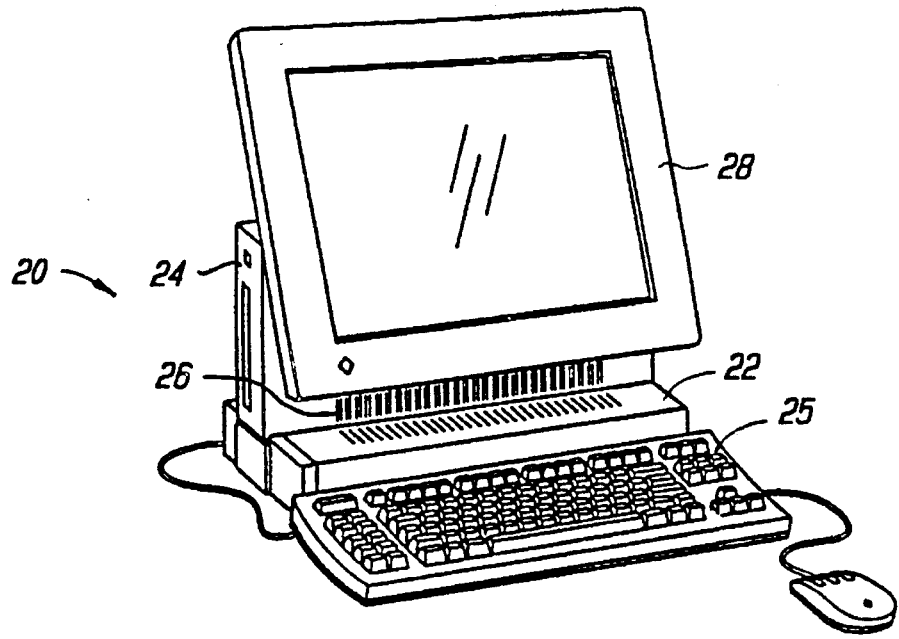
FIG. 1 is a front perspective view of the workstation compact housing of the invention.

FIG. 1 is a front perspective view of the workstation compact housing 20 of the invention. The housing 20 includes a horizontal base housing 22 and a vertical tower housing 24 that are enclosed by a vented exterior skin 26. The vertical tower housing 24 supports a detachable pivot display system 28.

The horizontal base housing 22 has a small footprint of approximately 5.5 inches by 14.0 inches. If a full keyboard 25 is used, then the footprint of the entire system is approximately equivalent to that of a portable personal computer. As will be described below, the horizontal base housing 22 does not merely serve as a structural device. Instead, the horizontal base housing 22 encases a number of functional elements. The positioning of functional elements within the horizontal base housing 22 provides efficient utilization of space. In addition, the weight of the functional elements provides stability for the housing 20. Preferably, the heavier functional components are positioned in the horizontal base housing 22.

Figure 2:
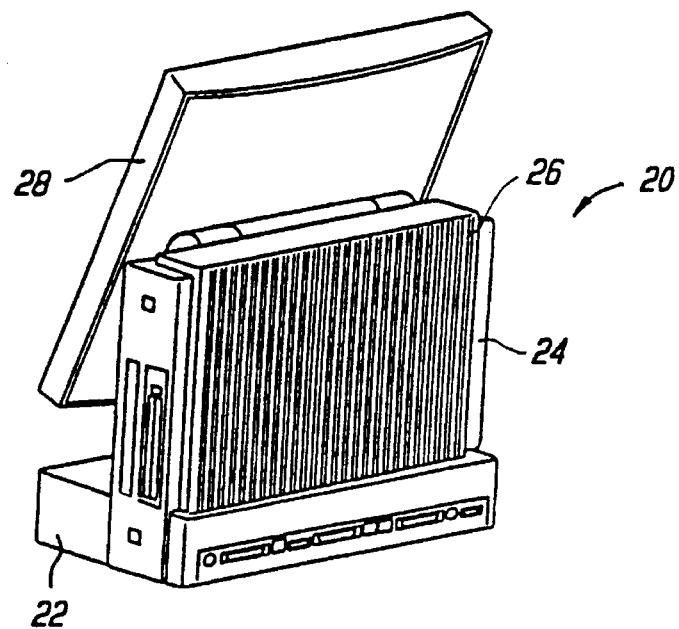
FIG. 2 is a rear perspective view of the workstation compact housing of the invention.

FIG. 2 is a rear perspective view of the workstation housing 20. The figure illustrates the horizontal base housing 22, the vertical tower housing 24, and the vented exterior skin 26. The figure also illustrates the detachable pivot display system 28.

Figure 3:
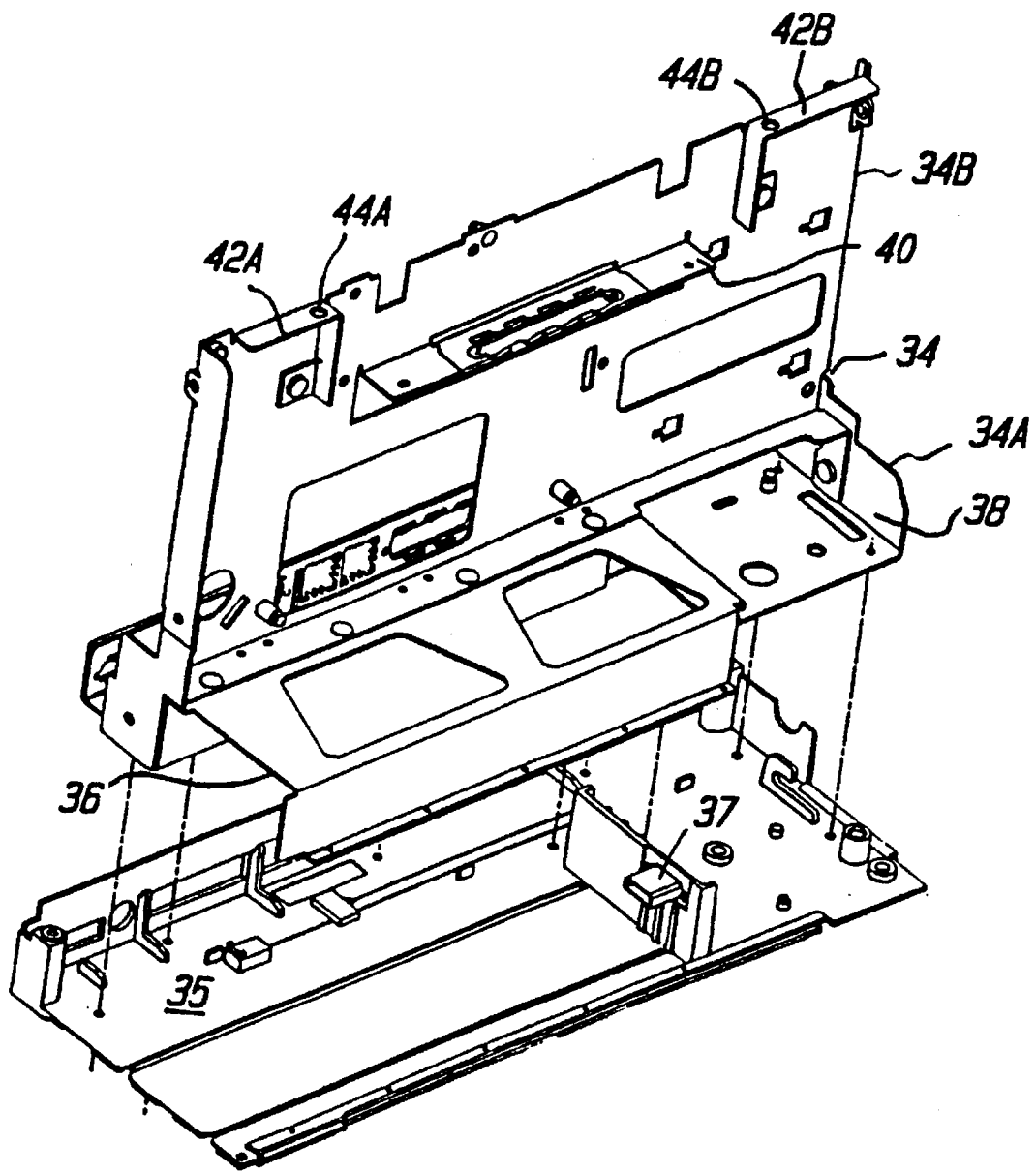
FIG. 3 is an exploded front perspective view of the structural heat sink of the invention.

FIG. 3 is an exploded perspective view of the structural heat sink 34 of the invention, including horizontal base heat sink 34a and vertical tower heat sink 34b. The structural heat sink 34 serves as the basic support structure for the housing 20 and also as a heat sink to accommodate the large heat generation associated with workstation-class computers. The structural heat sink 34 conductively removes heat from heat-generating functional elements within the housing 20 and distributes the heat to other regions of the structural heat sink 34. The vented exterior skin 26 (FIG. 2) allows for convective heat transfer from the structural heat sink 34. This configuration, which will be more fully described below, allows for a workstation-class computer without active cooling elements.

The structural heat sink 34 includes a horizontal base heat sink 34a and a vertical tower heat sink 34b. The horizontal base heat sink 34a is attached to a flat base housing 35, preferably formed of plastic. An interchangeable power source housing 36 is formed in the horizontal base heat sink 34a. The power source housing 36 supports an electrical connector 37. As will be described below, the electrical connector 37 allows a battery positioned within the power source housing 36 to be charged while the computer is driven from an external power supply. The horizontal base heat sink 34a also includes a hard disk drive receptacle 38, that will be discussed below.

The vertical tower heat sink 34b includes a display socket ledge 40. The vertical tower heat sink 34b also includes a mounting ledge 42 that has ledge segments 42A and 42B. The display mounting ledge 42 supports display mounting orifices 44A and 44B. As will be described below, these components facilitate attachment and detachment of a computer display. The structural heat sink 34 is formed of metal, preferably aluminum.

Figure 4:
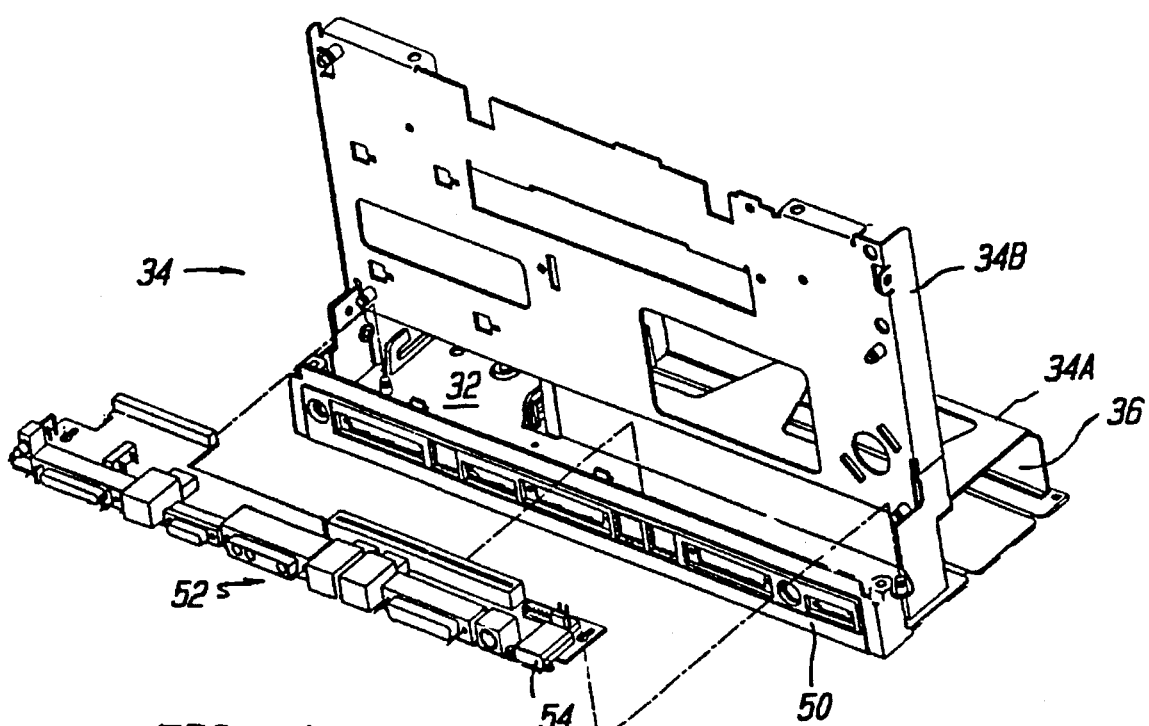
FIG. 4 is an exploded rear perspective view of the structural heat sink of the invention; the figure shows the input/output port face plate of the structural heat sink.

FIG. 4 is an exploded rear perspective view of the structural heat sink 34. The figure illustrates an input/output port face plate 50 that is positioned at the rear of the horizontal base heat sink 34a. The input/output port face plate 50 receives a plurality of input/output connectors 52. The input/output connectors 52 include a power source connector 54 that will be described below.

Figure 5:
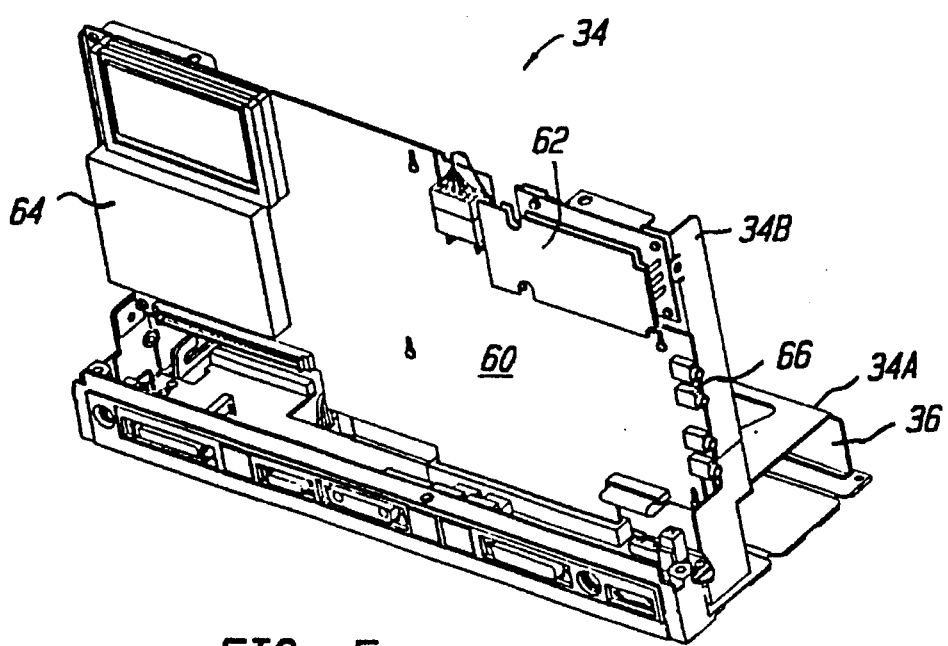
FIG. 5 is a rear perspective view of the structural heat sink of the invention with a CPU board in place; the figure depicts a power converter directly coupled to the vertical tower heat sink of the structural heat sink.

FIG. 5 is a rear perspective view of the structural heat sink 34. The figure illustrates a vertical CPU board 60 mounted on the vertical tower heat sink 34b. The figure also shows a power converter 62 directly coupled to the vertical tower heat sink 34b. In this example, the power converter 62 is a dc-to-dc converter. This direct coupling allows effective heat conduction away from the power converter 62. In a workstation-class computer as herein, the power converter will generally handle approximately 40 Watts of power. The power converter 62 is preferably positioned, as shown in FIG. 5, at the upper corner of the vertical tower heat sink 34b. In this position, the converter 62 is exposed to the vented exterior skin 26 and the generated heat does not have to rise the entire vertical length of the vertical tower heat sink 34b.

FIG. 5 also depicts a Personal Computer Memory Card International Association (PCMCIA) connector 64 positioned on the vertical CPU board 60. Projecting input/output audio connectors 66 are also illustrated in the figure. As will be described below, the slide-in end caps of the invention are positioned over the projecting input/output audio connectors 66.

Figure 6:
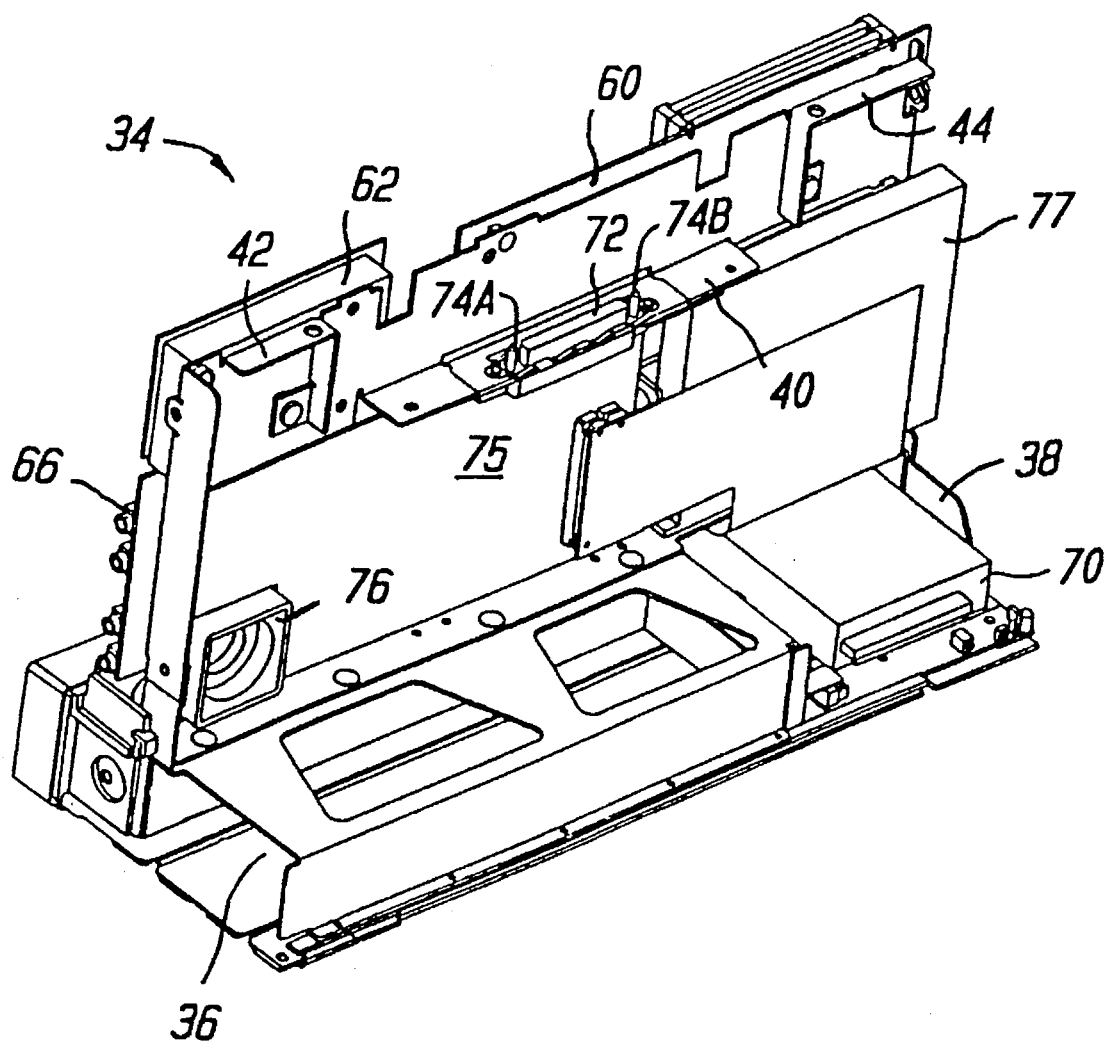
FIG. 6 is a front perspective view of the structural heat sink of the invention; the figure illustrates the interchangeable power source housing and hard disk drive receptacle of the horizontal base housing of the structural heat sink.

FIG. 6 is a front perspective view of the structural heat sink 34 with a hard disk drive 70 positioned therein. The hard disk drive 70 is positioned within the receptacle 38 and thereby allows the hard disk drive 70 to be in a stationary and secure low center of gravity position that is minimally effected by incidental jostling of the housing 20. The weight of the hard disk drive 70 and other functional elements, such as a battery positioned within the interchangeable power source housing 36, provide stability for the housing 20. The receptacle 38 and housing 36 are preferably formed of aluminum and thereby serve to convey heat away from the elements positioned therein.

FIG. 6 illustrates a female display connector 72 positioned on display socket ledge 40. On each longitudinal side of the connector 72 is a display connector guide pin 74A and 74B. As will be described below, the female display connector 72 accommodates direct connection with the detachable pivot display system 28. In other words, a cable is not used between the display system 28 and the connector 72. The guide pins 74 facilitate the connection process. FIG. 6 also illustrates a video board 75 that operates in conjunction with a speaker 76. A floppy disc drive 77 is illustrated on the right side of the figure.

Figure 7:
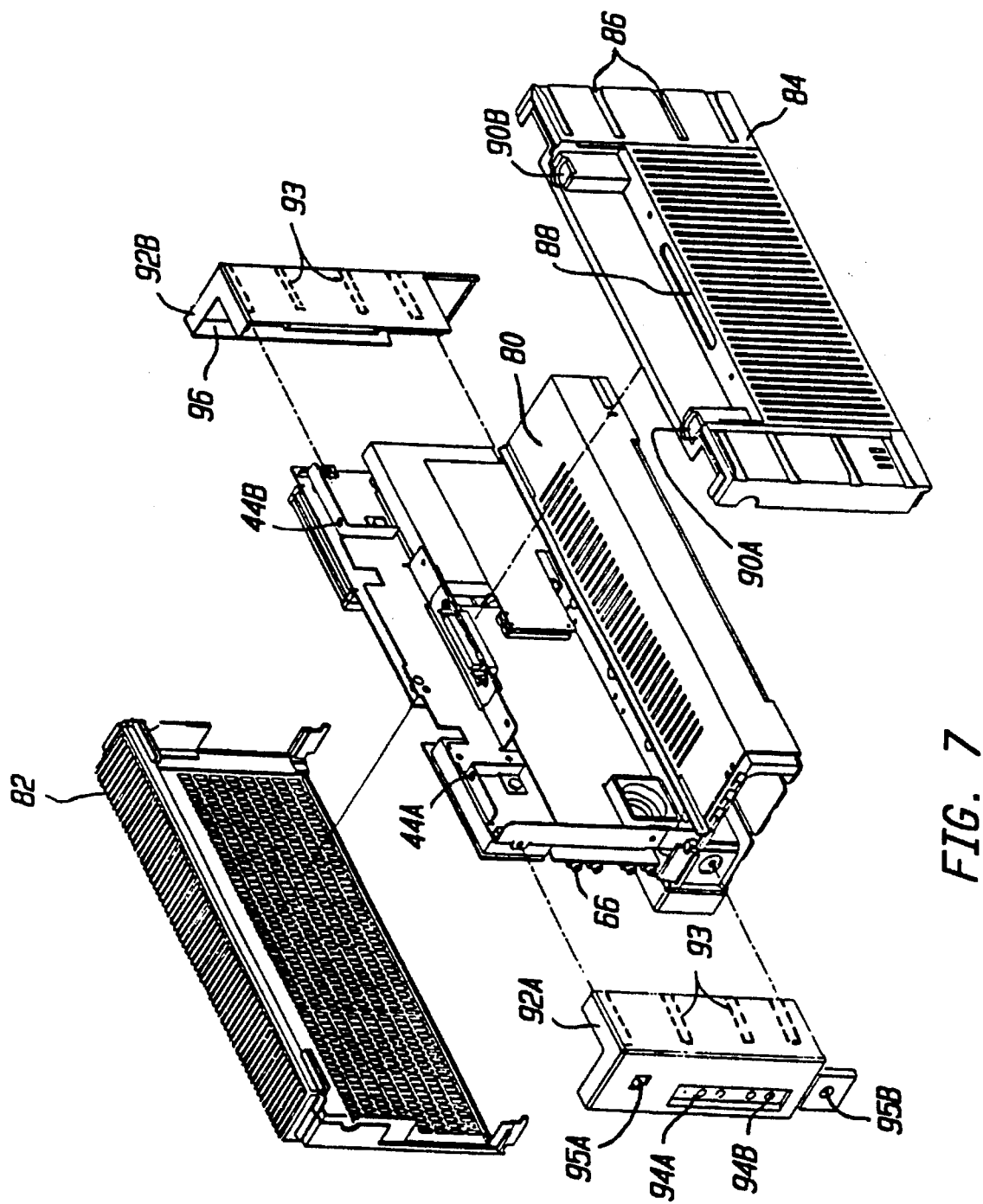
FIG. 7 is an exploded front perspective view of the vented exterior skin of the invention.

FIG. 7 illustrates the different components of the vented exterior skin 26. Namely, the figure shows a horizontal vented exterior skin 80, a rear vertical vented exterior skin 82, and a front vertical vented exterior skin 84. The vented exterior skin 26 is preferably formed of injection molded plastic that is plated with electroless copper nickel to reduce electro-magnetic interference. Preferably, the vents are in a staggered configuration, allowing air movement, but limiting electro-magnetic interference.

The front vertical vented exterior skin 84 includes skin channels 86 that serve to hold the different vented exterior skin components together, as will be described below. The front vertical vented exterior skin 84 has a display connector aperture 88 and display mounting pin apertures 90A and 90B that are respectively aligned with the female display connector 72 and the display mounting orifices 44A and 44B.

FIG. 7 also depicts slide-in end caps 92A and 92B. The slide-in end caps 92 include end cap protrusions 93, shown in phantom, that mate with the corresponding skin channels 86 of the front vertical vented exterior skin 84. The end cap ledge 96 grips the rear side of the rear vertical vented exterior skin 82, as can be appreciated from FIG. 7. Consequently, the slide-in end caps 92 serve to hold the rear vertical vented exterior skin 82 and the front vertical vented exterior skin 84. In a preferred embodiment, screws are placed in screw receptacles 95A and 95B positioned in the end caps 92. Preferably, the end cap protrusions 93 are ramped in such a manner that when the screws used in screw receptacles 95A and 95B are tightened, the ramped end cap protrusions 93 force the front vertical vented exterior skin 84 and the rear vertical vented exterior skin 82 into a tighter fit.

It should be noted that the plastic plated end caps 92 provide shielding for the computer. Also note in FIG. 7 that the slide-in end caps 92 are conveniently positioned over the projecting audio input/output connectors 66 that align with the end cap apertures 94. (A similar fit is made with other projecting connections.) In other words, the projecting input/output connectors 66 are easily accommodated by the housing since the slide-in end caps 92 slide over the connectors 66. This feature would not be available if the end caps 92 were placed in position from the top of the housing 20.

Figure 8:
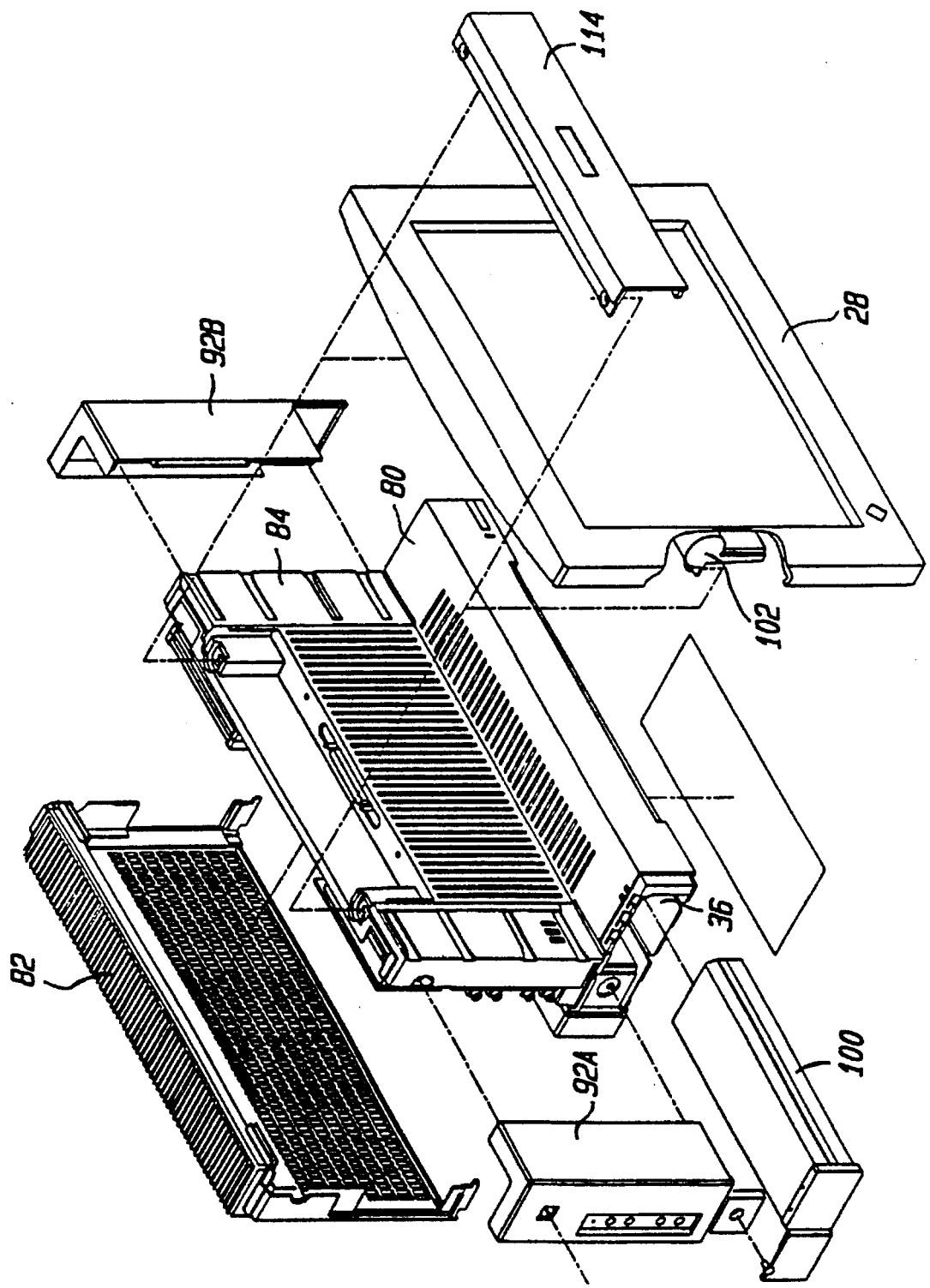
FIG. 8 is an exploded front perspective view of the detachable pivot display system of the invention and its relation to the other portion of the invention's housing.
Figure 9:
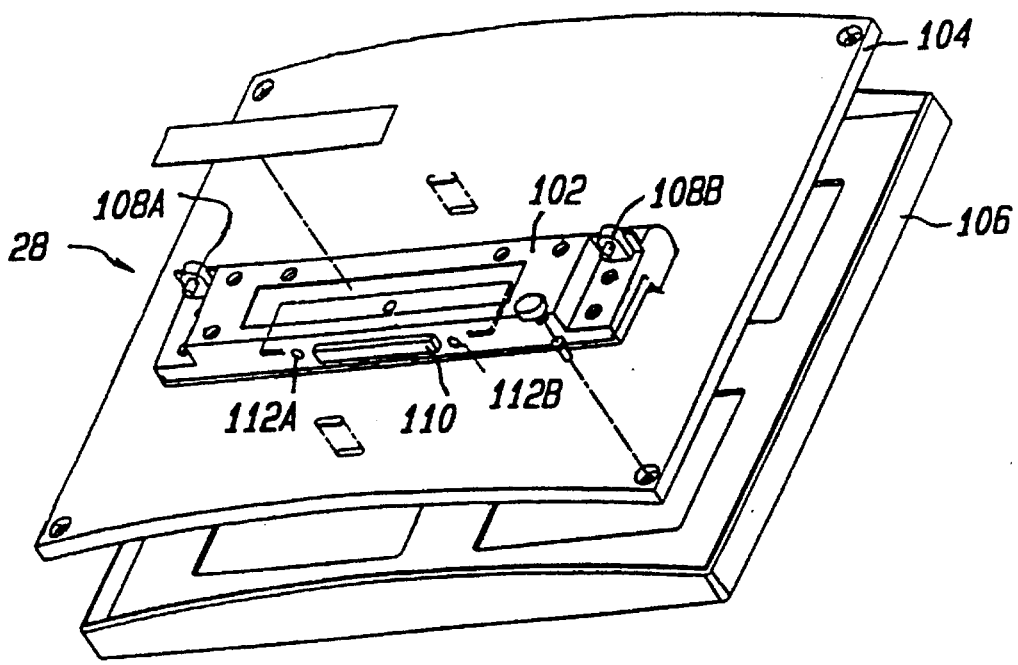
FIG. 9 is an exploded rear perspective view of the detachable pivot display system of the invention.

FIG. 8 illustrates that a battery 100 may be positioned within interchangeable power source housing 36. The figure also illustrates the manner in which the detachable pivot display system 28 is attached to the rest of the housing 20. Detachable pivot display system 28 includes a pivoting attachment structure 102, that is more fully appreciated with reference to FIG. 9.

The pivoting attachment structure 102 pivots in a rear display segment 104 that is attached to a front display segment 106. The rear display segment 104 is preferably formed of cast magnesium. The display system 28 preferably includes its own power supply and supporting electronics. Preferably, the attachment structure 102 is in the middle of the display 28. Therefore, the computer is equally stable, regardless of the tilt of the display 28.

The attachment structure 102 includes mounting pins 108A and 108B that are received by the previously described display mounting orifices 44A and 44B. A male display connector 110 is also set in the attachment structure 102. Alignment of the male display connector 110 is facilitated by display connector guide receptacles 112 that mate with the previously described display connector guide pins 74A and 74B. Thus, it will be appreciated that the detachable pivot display system 28 is readily connected to the computer housing 20 by placing the mounting pins 108 in the display mounting orifices 44 and simultaneously mating the female connector 72 with the male connector 110, with the assistance of the display connector guide pins 74. Mounting pins 108 may be in the form of screws and the display mounting orifices 44 may be in the form of threaded receptacles.

Returning to FIG. 8, panel 114 is preferably utilized if the display 28 is not used. The panel 114 serves as an aesthetic dress panel to close up the area otherwise occupied by the pivoting attachment structure 102. The panel 114 also protects the video connector 72 from dirt and electrostatic discharge.

FIG. 8 illustrates that the display 28 is mounted at the approximate center line of the housing 20. Since the display 28 is at the center line, it can be positioned at a higher vertical location, thereby improving the ergonomics of the computer.

Figure 10:
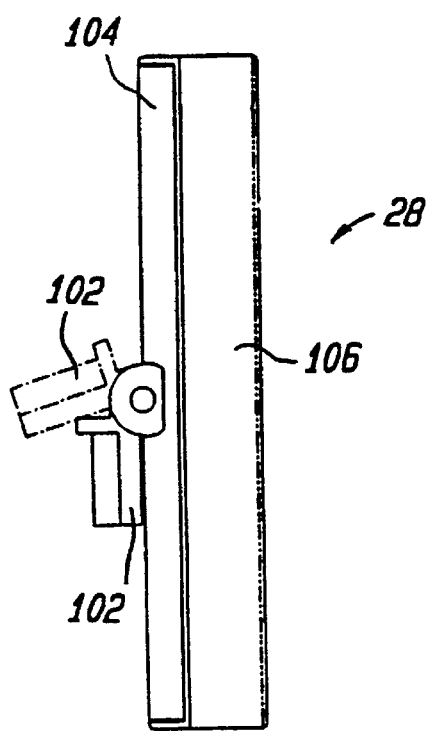
FIG. 10 is a side view of the detachable pivot display system of the invention.

FIG. 10 is a side view of the detachable pivot display system 28, specifically showing the pivoting action of the pivoting attachment structure 102.

Figure 11:
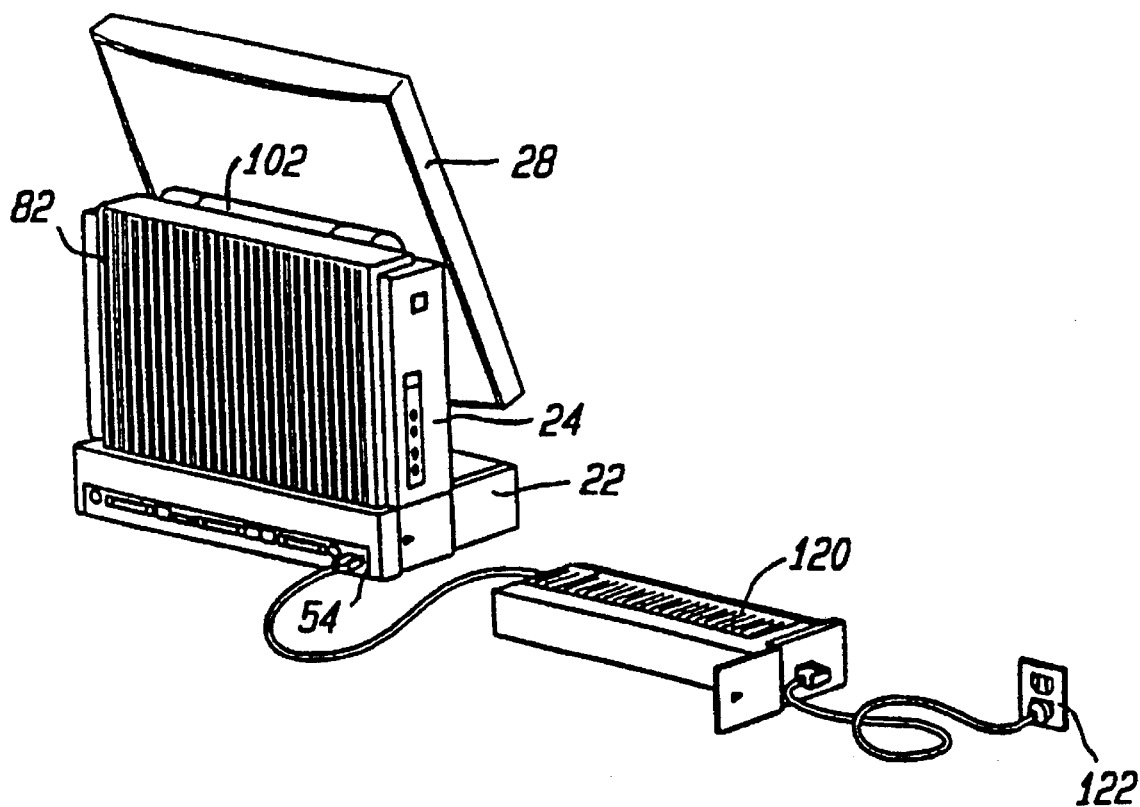
FIG. 11 illustrates the operation of the removable power supply positioned outside of the compact housing while the removable battery is charged inside the compact housing.

All mechanical aspects of the novel workstation compact housing 20 of the invention have been described. Attention now turns to the electrical aspects of the housing 20. FIG. 8 illustrated a battery 100 being positioned within the interchangeable power source housing 36. In FIG. 11, the battery (not shown) is within the housing 20. A power supply 120 is positioned outside of the housing 20, but is electrically connected to the housing via power source connector 54. The power supply 120 is also electrically connected to a standard electrical wall outlet 122. An electrical path exists from the power source connector 54 to the electrical contact 37 (shown in FIG. 3). Battery 100 includes circuitry to allow the battery 100 to be charged while the computer is operated from the externally positioned power supply 120. This circuitry is described in the commonly assigned co-pending application entitled "Smart Battery System and Interface", Ser. No. 08/190,669, filed Feb. 1, 1994, which is expressly incorporated by reference herein.

Thus, the housing 20 of the invention interchangeably receives, within interchangeable power source housing 36, either a battery 100 or a power supply 120. Moreover, the housing 20 provides the novel capability of charging the internally positioned battery 100 while the computer is powered through the externally positioned power source 120.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A compact housing for a computer workstation, comprising:

a structural heat sink including:

a horizontal base heat sink to house a first plurality of electronic elements, said horizontal base heat sink including an interchangeable power source housing supporting an electrical connector, said horizontal base heat sink operating to conduct heat away from said first plurality of electronic elements; and a vertical tower heat sink fixedly attached to said horizontal base heat sink in a substantially orthogonal manner such that at least one electronic element of said first plurality of electronic elements is positioned on both sides of said vertical tower heat sink, said vertical tower heat sink including a first side and a second side to support a second plurality of electronic elements, said vertical tower heat sink operating to conduct heat away from said second plurality of electronic elements; and a vented exterior skin enclosing said structural heat sink, said vented exterior skin including a plurality of vents extending across the majority of the surface area of said vented exterior skin, said vented exterior skin operating to facilitate convective heat transfer from said structural heat sink so as to provide passive cooling capability that eliminates the need for active cooling devices.

2. The compact housing of claim 1 wherein said horizontal base heat sink includes a hard disk drive receptacle.

3. The compact housing of claim 1 wherein said vertical tower heat sink supports a power converter that is directly coupled thereto.

4. The compact housing of claim 1 wherein said vented exterior skin includes:

a rear vertical vented exterior skin;

a front vertical vented exterior skin; and slide-in end caps to securely couple said rear vertical vented exterior skin and said front vertical vented exterior skin and thereby enclose said vertical tower heat sink.

5. The compact housing of claim 4 wherein said front vertical vented exterior skin includes a plurality of channels and said slide-in end caps include a corresponding plurality of ramped protrusions to mate with said plurality of channels.

6. The compact housing of claim 5 wherein said slide-in end caps include a plurality of end cap apertures that are positioned over a corresponding plurality of projecting input/output connectors extending from said compact housing.

7. The compact housing of claim 1 wherein said vertical tower heat sink includes:

a display socket ledge supporting a first connector and display connector guide pins positioned on each longitudinal end of said first connector; and a display mounting ledge including display mounting orifices.

8. The compact housing of claim 7 further including a detachable pivot display system including a pivoting attachment structure positioned proximate to the center of said detachable pivot display system, said pivoting attachment structure including:

mounting pins for mating with said display mounting orifices;

a second connector for mating with said first connector; and display connector guide receptacles for receiving said display connector guide pins.

9. A compact housing for a computer workstation, comprising:

a structural heat sink including:

a horizontal base heat sink to house a first plurality of electronic elements, said horizontal base heat sink including an interchangeable power source housing supporting an electrical connector; and a vertical tower heat sink fixedly secured to said horizontal base heat sink to support a second plurality of electronic elements, said vertical tower heat sink including:

a first side supporting a first subset of said second plurality of electronic elements and a second side supporting a second subset of said second plurality of electronic elements, a display socket ledge supporting a first connector and display connector guide pins positioned on each longitudinal end of said first connector; and a display mounting ledge including display mounting orifices; and a detachable pivot display system including a pivoting attachment structure positioned proximate the center of said detachable pivot display system, said pivoting attachment structure including:

mounting pins for mating with said display mounting orifices;

a second connector for mating with said first connector; and display connector guide receptacles for receiving said display connector guide pins, such that said detachable pivot display system is positioned proximate to the center line of said horizontal base heat sink.

10. The compact housing of claim 9 wherein said horizontal base heat sink includes a hard disk drive receptacle.

11. The compact housing of claim 9 wherein said vertical tower heat sink supports a power converter that is directly coupled thereto.

12. The compact housing of claim 9 further comprising a vented exterior skin enclosing said structural heat sink, said vented exterior skin including a plurality of vents extending across the majority of the surface area of said vented exterior skin, said vented exterior skin operating to facilitate convective heat transfer from said structural heat sink so as to provide passive cooling capability that eliminates the need for active cooling devices.

13. The compact housing of claim 12 wherein said vented exterior skin includes:

a rear vertical vented exterior skin;

a front vertical vented exterior skin; and slide-in end caps to securely couple said rear vertical vented exterior skin and said front vertical vented exterior skin and thereby enclose said vertical tower heat sink.

14. The compact housing of claim 13 wherein said front vertical vented exterior skin includes a plurality of channels and said slide-in end caps include a corresponding plurality of protrusions to mate with said plurality of channels.

15. The compact housing of claim 14 wherein said slide-in end caps include a plurality of end cap apertures that are positioned over a corresponding plurality of projecting input/output connectors of said compact housing.

16. A compact housing for a computer workstation, comprising:

a structural heat sink including:

a horizontal base heat sink including:

a first plurality of electronic elements, said horizontal base heat sink operating to conduct heat away from said first plurality of electronic elements;

an input/output face plate for receiving a plurality of input/output connectors, one of said plurality of input/output connectors including a first electrical connector for receiving power from a removable power supply positioned outside said compact housing;

an interchangeable power source housing supporting an electrical connector for alternately receiving a removable battery and said removable power supply; and a vertical tower heat sink, fixedly secured to said horizontal base heat sink, such that at least one electronic element of said first plurality of electronic elements is positioned on both sides of said vertical tower heat sink, said vertical tower heat sink including a first side and a second side to support a second plurality of electronic elements; and a vented exterior skin enclosing said structural heat sink, said vented exterior skin including a plurality of vents extending across the majority of the surface area of said vented exterior skin, said vented exterior skin operating to facilitate convective heat transfer from said structural heat sink so as to provide passive cooling capability that eliminates the need for active cooling devices.

17. The compact housing of claim 16 wherein said horizontal base heat sink further includes a hard disk drive receptacle.

18. The compact housing of claim 16 wherein said vented exterior skin includes:

a rear vertical vented exterior skin;

a front vertical vented exterior skin; and slide-in end caps to securely couple said rear vertical vented exterior skin and said front vertical vented exterior skin and thereby enclose said vertical tower heat sink.

19. The compact housing of claim 18 wherein said front vertical vented exterior skin includes a plurality of channels and said slide-in end caps include a corresponding plurality of protrusions to mate with said plurality of channels.

20. The compact housing of claim 19 wherein said slide-in end caps include a plurality of end cap apertures that are positioned over a corresponding plurality of projecting input/output connectors extending from said compact housing.

21. The compact housing of claim 16 wherein said vertical tower heat sink further includes:

a display socket ledge supporting a first connector and display connector guide pins positioned on each longitudinal end of said first connector; and a display mounting ledge including display mounting orifices.

22. The compact housing of claim 21 further including a detachable pivot display system including a pivoting attachment structure, said pivoting attachment structure including:

mounting pins for mating with said display mounting orifices;

a second connector for mating with said first connector; and display connector guide receptacles for receiving said display connector guide pins.

23. A method of constructing a compact housing for a computer workstation, comprising the steps of:

erecting a structural heat sink, said erecting step including the steps of:

providing a horizontal base heat sink to house a first plurality of electronic elements, said horizontal base heat sink including an interchangeable power source housing supporting an electrical connector; and fixedly attaching a vertical tower heat sink to said horizontal base heat sink in a substantially orthogonal manner such that at least one electronic element of said first plurality of electronic elements is positioned on both sides of said vertical tower heat sink, said vertical tower heat sink including a first side and a second side to support a second plurality of electronic elements; and enclosing said structural heat sink with a vented exterior skin, said vented exterior skin including a plurality of vents extending across the majority of the surface area of said vented exterior skin, said vented exterior skin operating to facilitate convective heat transfer from said structural heat sink so as to provide passive cooling capability that eliminates the need for active cooling devices.

24. The method of claim 23 wherein said enclosing step includes the steps of:

positioning a rear vertical vented exterior skin over said structural heat sink;

placing a front vertical vented exterior skin over said structural heat sink; and guiding slide-in end caps into a position to securely couple said rear vertical vented exterior skin and said front vertical vented exterior skin.

25. The method of claim 24 wherein said guiding step includes the step of using slide-in end caps with ramped protrusions that mate with corresponding channels formed in said front vertical vented exterior skin.

26. The method of claim 24 wherein said guiding step includes the step of positioning said slide-in end caps over projecting input/output connectors extending from said compact housing.

27. The method of claim 23 further comprising the step of attaching a detachable pivot display system to said computer workstation.

* * * * *